(12) United States Patent
Myrfield

(10) Patent No.: US 6,681,672 B2
(45) Date of Patent: Jan. 27, 2004

(54) OPTIMIZED BAND SAW FEED SPEED SYSTEM

(76) Inventor: Warren L. Myrfield, 10211 Mullen Rd., Olympia, WA (US) 98513

( * ) Notice: Subject to any disclaimer, the term of this patent is extended or adjusted under 35 U.S.C. 154(b) by 239 days.

(21) Appl. No.: 09/767,993

(22) Filed: Jan. 23, 2001

(65) Prior Publication Data

US 2001/0034561 A1 Oct. 25, 2001

Related U.S. Application Data

(60) Provisional application No. 60/180,895, filed on Feb. 7, 2000.

(51) Int. Cl.[7] .............................................. G05B 19/18
(52) U.S. Cl. ......................... 83/367; 700/66; 700/264; 700/63; 700/188; 700/304; 700/59; 345/833; 345/839; 144/356; 144/357; 356/399; 356/400; 356/626; 83/365
(58) Field of Search .............................. 700/83, 32, 28, 700/58–59, 63, 188, 264, 304, 17, 56, 60, 61, 65, 66, 186; 318/561; 356/399, 400, 626; 144/356, 357; 345/833, 839; 83/72–76, 858, 365, 367

(56) References Cited

U.S. PATENT DOCUMENTS

| | | | | |
|---|---|---|---|---|
| 4,014,235 A | * | 3/1977 | Fukami | 83/565 |
| 4,372,640 A | * | 2/1983 | LaCroix | 359/210 |
| 4,539,634 A | * | 9/1985 | Sakai et al. | 700/180 |
| 4,766,790 A | * | 8/1988 | Harris | 83/56 |
| 4,879,752 A | * | 11/1989 | Aune et al. | 382/141 |
| 4,901,612 A | * | 2/1990 | Harris | 83/56 |
| 4,926,917 A | * | 5/1990 | Kirbach | 144/356 |
| 4,991,475 A | * | 2/1991 | Malcok et al. | 83/13 |
| 5,305,673 A | * | 4/1994 | Costley | 83/802 |
| 5,493,642 A | * | 2/1996 | Dunsmuir et al. | 345/839 |
| 5,694,821 A | * | 12/1997 | Smith | 83/13 |
| 6,382,062 B1 | * | 5/2002 | Smith | 83/74 |
| 6,467,352 B2 | * | 10/2002 | Schafer et al. | 73/597 |

* cited by examiner

*Primary Examiner*—Anil Khatri
*Assistant Examiner*—Crystal J. Barnes
(74) *Attorney, Agent, or Firm*—Olson & Olson

(57) ABSTRACT

The optimized band saw feed speed system of this invention is associated with a saw mill carriage reciprocable past a band saw by a power drive motor. The feed speed control system utilizes a first laser line arranged to allow video scanning of the diameter profile of a log on the carriage for measuring the impending depth of cut by the band saw blade as the carriage moves the log through the band saw. A second laser line is arranged to show on the band saw blade for detecting the lateral deviation of the blade from its path. A video camera is arranged to cover the diameter of a log on the carriage and to view the laser line projections and control the speed of the power drive motor of the carriage, to provide optimum speed of movement of the log through the band saw.

4 Claims, 4 Drawing Sheets

OPTIMIZED BAND SAW FEED SPEED SYSTEM

This application claims the benefit under 35 U.S.C. 119(e) of U.S. Provisional application Ser. No. 60/180,895 filed Feb. 7, 2000.

BACKGROUND OF THE INVENTION

This invention relates to band saws and more particularly to the control of speed of material being fed to a band saw to achieve optimum cutting operation.

Systems have been proposed heretofore for controlling the speed of material through a band saw. U.S. Pat. No. 4,926,917 discloses the use of two saw line light lines, one at the entrance end of a log and the other at the exit end on the opposite side of the log, to determine the thickness of the log, and a microprocessor produces an electric signal for controlling the speed of feed of the log through the band saw. A transducer is employed to measure lateral deflection of the saw blade as an indication to an operator of dull saw teeth or other problem with the blade.

In U.S. Pat. No. 5,694,821 the depth of cut measurement is similar to that disclosed in the patent discussed above, an electromagnetic proximity sensor detects lateral deflection of a band saw blade and the electric signal is processed to provide a corresponding electric drive motor signal to increase or decrease the speed of a log being moved through the band saw.

Both of the systems disclosed above utilize measurement methods of limited accuracy and therefore the precision of log feed rate and deviation resolution are less than desired.

SUMMARY OF THE INVENTION

The band saw feed speed system of this invention utilizes a first laser light line to provide a three dimensional reference for the depth of cut measurement, a second laser light line to provide a three dimensional reference for saw blade deviation measurement, and a video camera to provide a view of the full range of log diameters and of the laser light projections and to supply measurement data to a microprocessor which controls the variable drive motor of a saw mill log transport mechanism according to the variations in depth of cut being made by a band saw blade and according to variations in lateral deviation of the band saw blade.

It is the principal objective of this invention to provide a band saw feed speed system that overcomes the aforementioned limitations of prior band saw feed speed systems.

Another objective of this invention is to provide a band saw feed speed system of the class described in which the detection of band saw blade deviation provides a more direct measurement and correspondingly increased precision of deviation measurements.

A further objective of this invention is the provision of a band saw feed speed system of the class described in which the measurements of depth of cut and lateral band saw blade deviation are made with precision laser beams and a video camera communicating with a microprocessor for controlling the speed of the drive motor of the log transport mechanism.

The foregoing and other objects and advantages of this invention will appear from the following detailed description, taken in connection with the accompanying drawings of a preferred embodiment.

DESCRIPTION OF THE PREFERRED EMBODIMENT

In accordance with this invention, machine vision technology is utilized to scan wood, such as a log, for depth of cut in front of the saw and also scan the saw blade for cutting deviation. These measurements are derived with structural light three dimensional machine vision. Laser lines are used to provide the structured lighting for the desired measurements and a high resolution video camera provides the image data representing the measurements. The video image data are utilized by a microprocessor having a video frame grabber connected to the video output of the camera to vary the speed of the drive motor of a saw mill log transport mechanism, such as a carriage, sharp chain, press rolls and others, to control the optimum feed speed of a log through a band saw.

Figure 1:
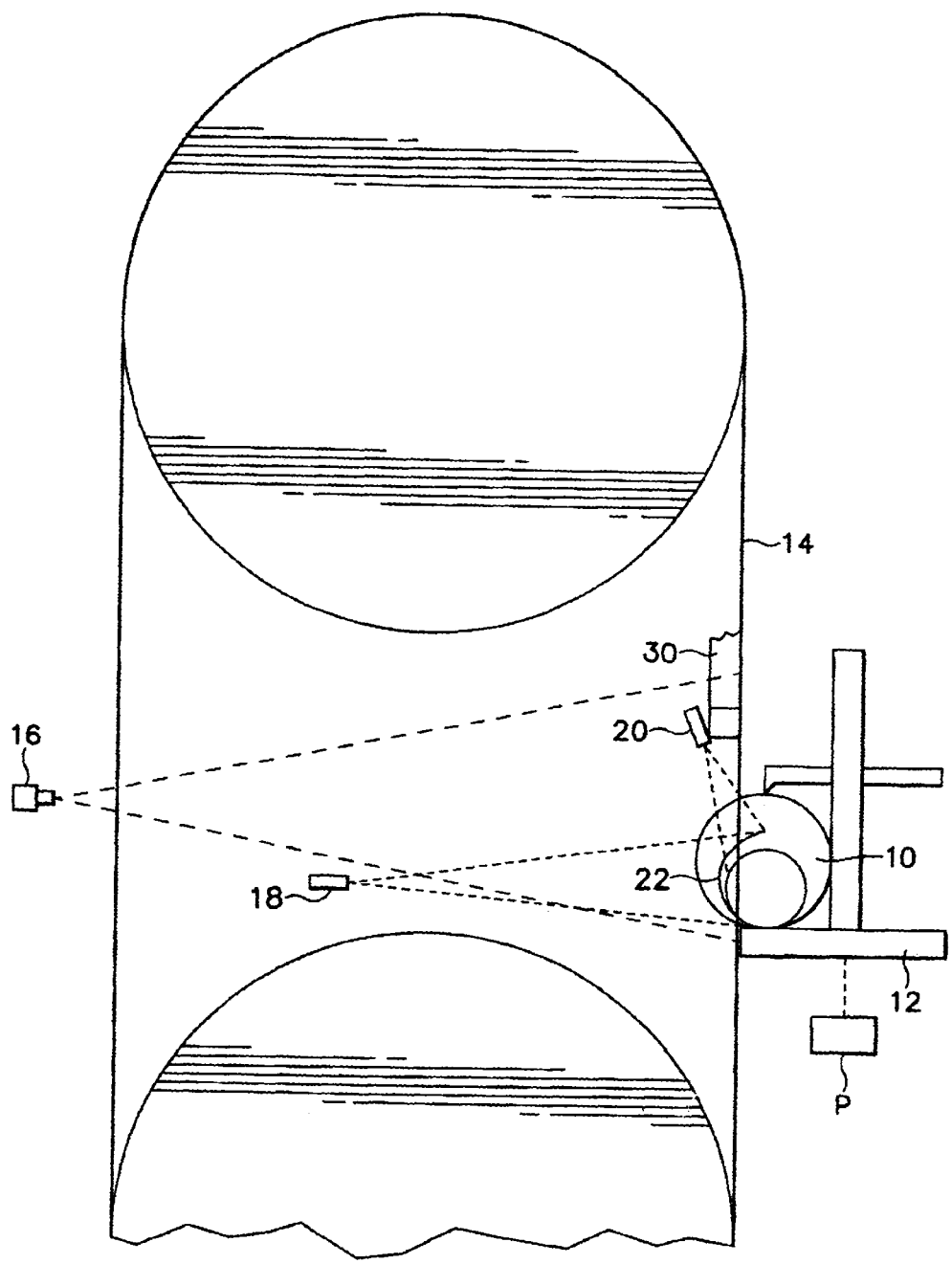
FIG. 1 is a fragmentary vertical front end elevation in schematic form showing the relationship between a saw mill carriage supporting a log and a band saw for cutting the log, and the relative positions of a video camera and two laser beams employed in the control of feed speed of a log, in accordance with this invention.

Referring to FIG. 1 of the drawings, the two measurements are obtained as a log 10, supported on carriage 12 reciprocated by a power drive P, is being fed into the band saw 14 with the use of two lasers and a video camera 16. The lasers are provided by conventional laser line generators. One laser 18 provides the three dimensional reference for the depth of cut measurement and the second laser 20 provides a three dimensional reference for the saw blade deviation measurement. The video camera field of view 16', shown in broken lines in FIG. 3, covers the range of log sizes and views the laser projections at an angle of approximately 90° to the cutting plane of the saw blade.

Figure 3:
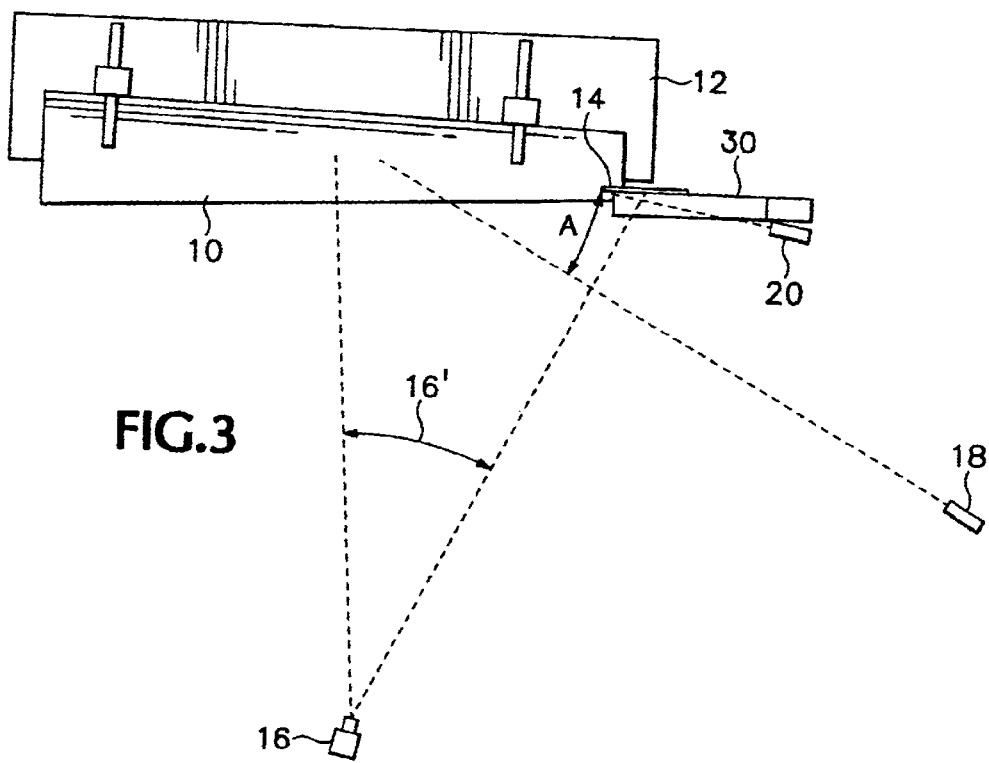
FIG. 3 is a top view as viewed from the top in FIG. 1, with the band saw removed.
Figure 4:
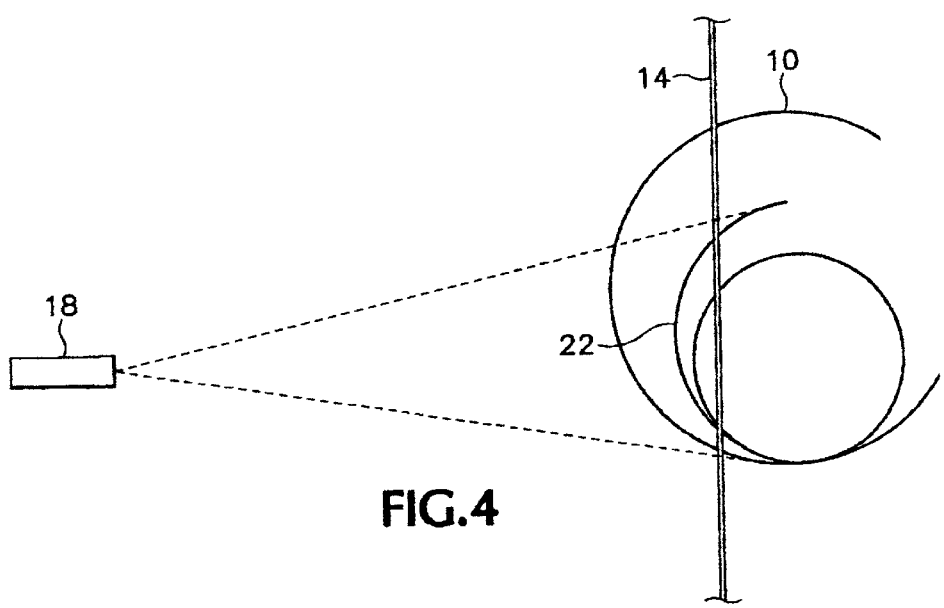
FIG. 4 is a fragmentary end elevation as viewed from the right in FIG. 3.
Figure 5:
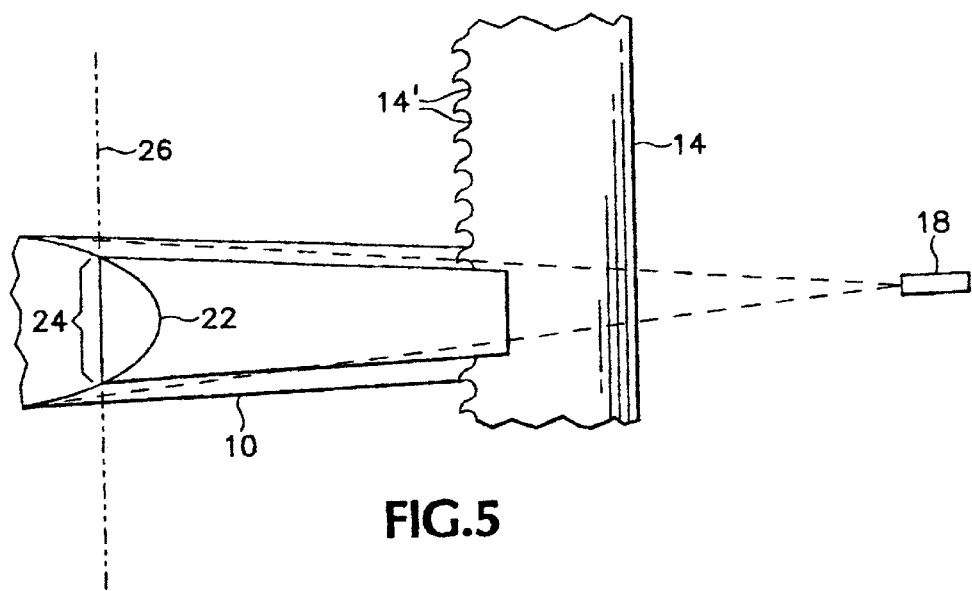
FIG. 5 is a fragmentary side elevation, enlarged from FIG. 2, showing the configuration of a laser beam defining the depth of cut.

The depth laser 18 appears as an arcuate line 22 on the log 10 (FIG. 5) a few feet in front of the saw, on an angle A of 30°–60°, preferably about 30°, to the plane of the saw blade 14 (FIG. 3). The depth of cut measurement 24 is derived from the perspective cross section 26 of the log at the intersection of the depth laser with the cutting plane of the saw blade (FIG. 5).

Figure 6:
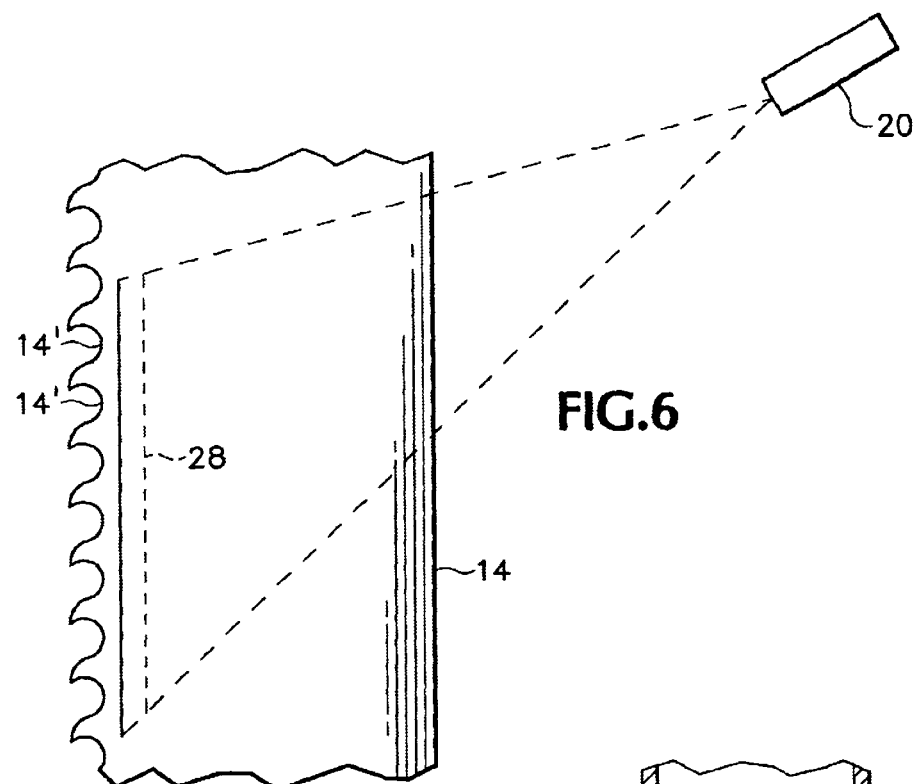
FIG. 6 is a fragmentary side elevation of the saw blade in association with a deviation reference laser beam.

The deviation laser 20 is projected as a line 28 onto the saw blade 14 close to the cutting edge (FIG. 6). The plane established by this laser is at an angle B (FIG. 7) of between 5° and 25°, preferably about 10° to the saw blade. To achieve this the laser is mounted on the saw guide 30 (FIG. 1) at an angle to the cutting edge of the blade in order for the laser to be out of the way of the feeding log. Mounting close to the saw blade also minimizes the effect of vibration. The deviation measurement is derived from the transverse movement of the laser line 28 on the saw blade as the blade deflects, deviating from its cutting path.

The resolution of saw blade deviation measurement must be within a few thousandths of an inch in order to hold lumber sizes within tolerances. This accuracy can only be achieved with the geometric gain resulting from the small angle B of the laser beam to the saw blade 14. Utilizing the physical property of the laser to maintain a focused line on the object that it strikes, even at an extreme angle, allows the movement of the laser line on the saw blade to be amplified, whereby to increase the degree of accuracy of deviation measurements.

Figure 7:
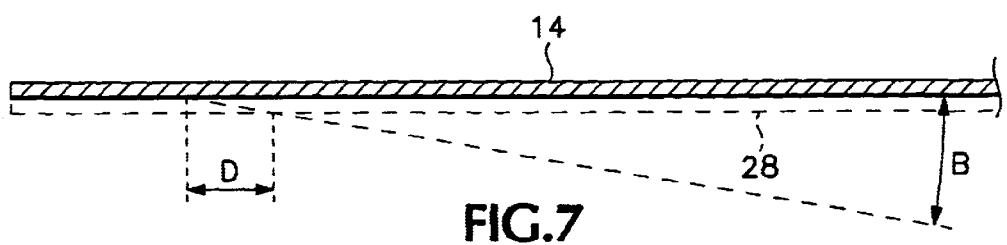
FIG. 7 is a fragmentary enlarged sectional view through the saw blade showing in broken lines a degree of lateral deviation of the saw blade and the magnified deviation viewed by the video camera for measurement.

The actual cutting deviation D (FIG. 7) is calculated by multiplying the movement of the laser line 28 on the saw blade by the tangent of angle between the blade and the laser beam, which amplifies the movement by a factor of about 5 times, when the angle B is 10°, as illustrated in FIG. 7. This gain, along with the capability of the machine vision software to measure in sub-pixel camera resolution, enables the measurement of the saw blade movement to one thousandth of an inch.

The camera 16 must be located from 5 to 10 feet from the cutting plane of the saw blade 14 in order to obtain a field of view that covers the range of log sizes with a lens around 12 mm in focal length. A wider angle lens will cause excessive distortion in the image. The camera also must be out of harms way. An industry standard camera with a pixel resolution of 752 by 480 and a field of view of 3 ft in the 752 pixel direction will produce a resolution of 0.048 inches per pixel. With the geometric gain of 5, the resolution is increased to 0.0096 inches per pixel. The camera vision algorithms used in the centroid calculations are needed to obtain a sub-pixel resolution near one thousandth of an inch.

Additional techniques used in the vision system to obtain the accuracy needed are as follows:

1. Calibrating the camera pixels to the real units on the cutting plane, which compensates for the viewing angle of the camera to the cutting plane. The method of calibration is described in U.S. Pat. No. 4,188,544.
2. Using LED light source 32 on the saw guide as a fixed reference to measure the relative movement of the laser line on the saw blade for cutting deviation, eliminates the effect of small movements of the camera due to vibration of the mounting structure. Small rotational movements of the camera can also be measured between the laser body 20 and the LED 32 to allow additional compensation.
3. Saving the deviation laser's relative position, while not in the cut, as the zero deviation reference.
4. Measuring the angle of the laser beam line on the saw blade while not in the cut allows the deviation measurement to be taken anywhere along the laser line with a compensation done for the installed angle.
5. Vibration mounts made of energy absorbing material, such as Sorbathane, minimizes movement of the camera.
6. Use of a narrow band (±10 nanometers) light filter on the camera, centered on the frequency of the laser, eliminates most ambient light and provides a clear image of the laser lines.
7. Replacement of any lighting directed at the saw blade that is necessary for the operator with a filtered floodlight fixture, for example of the kind used for stage lighting, that eliminates the red components of the light bulb. This prevents bright reflections off the saw blade and other shiny machine parts from interfering with the image of the lasers.

Calibration of the camera pixels to real units of measurement on the cutting plane is done by finding four points on the camera image that have known real coordinates. This can be done by using a flat rigid rectagular plate with small light emitting diodes (with a wide viewing angle) mounted in each corner. The plate must then be mounted in the cutting plane of the field of view of the camera. A simple way is to screw the plate to the cut surface of a log that is still held by the transport mechanism in the position it was cut. The calibration procedure then takes a camera snapshot and software locates each of the four points in the camera image in pixel coordinates. The pixel coordinates and the real coordinates of the LEDs are used for the calibration and coordinate transform functions.

Figure 8:
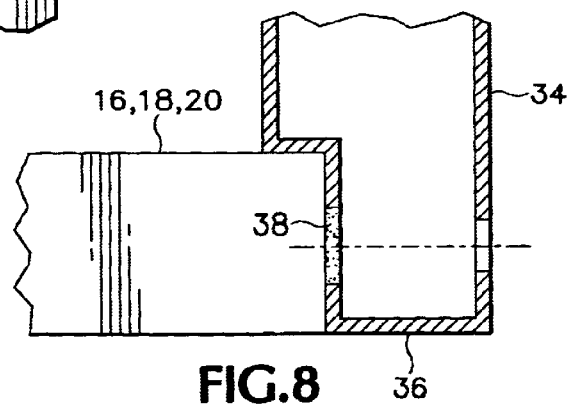
FIG. 8 is a fragmentary sectional view showing an arrangement for protecting the lasers and camera against environmental contamination.

In normal use, the laser and camera are mounted in an area of high contamination caused from sawdust, water and oil. With a laser light source, the smallest amount of contamination can disperse the beam. In order to provide a system with low maintenance, a high volume, low pressure clean air ring compressor is used to pump air into the air inlet 34 (FIG. 8) of a chamber 36 in front of the lasers and the camera enclosure. The lasers are sealed off from the air chamber with a sapphire window 38 to provide resistance to abrasion from small particulate matter that may not be filtered.

Interfacing to all machines requires monitoring the position of the log 10 with reference to the cutting edge of the saw blade 14. This is done with an encoder on a drive motor of the log transport 12. On machines where the log is loaded in a different position each time, like the conventional carriages or sharp chains, the position of the log is established when it reaches the depth laser 18 located 2 or 3 feet in front of the saw blade 14. The depth measurements are stored along with the locations on the log to be used to control the feed speed for the depth when it reaches the saw. When the first depth measurement is taken, the current velocity and the determined entry speed are used to calculate the point where the drive must start to decelerate to the entry speed.

The ability to interface to any machine, including a manually operated conventional carriage 12, is accomplished by intercepting the analog command signal to the drive from the operator control handle or the sequencing controller as an input to the system motion controller. This allows the operator or the sequencing controller to be the master velocity control for safety and sequencing. While a log is detected at the depth laser 18 or in the saw 14, the operator or sequencer must push the speed greater than the system speed to allow the system speed to take control. The velocity will never exceed the system speed and the system speed will never exceed the master control operator or sequencer.

On a conventional carriage machine, a dual bar graph meter is provided as feedback for the operator. One bar on the meter shows the calculated system speed and the other shows the operator handle speed. This enables the operator to push the speed into the system control range and still be close to taking control when necessary.

Figure 2:
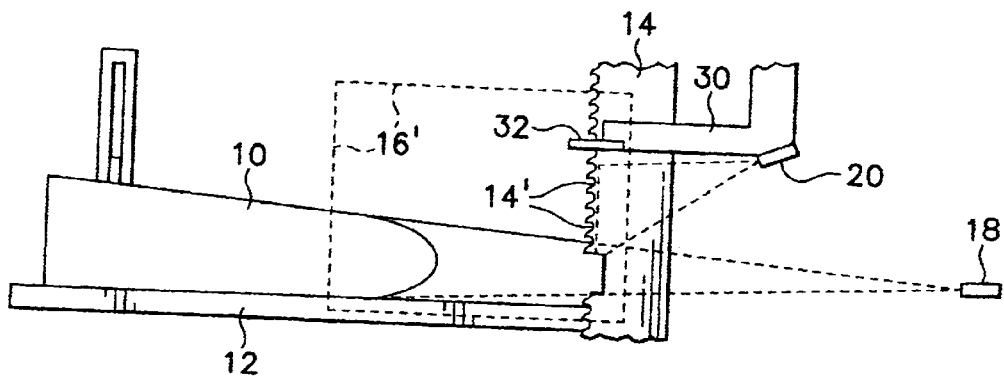
FIG. 2 is a fragmentary side elevation as viewed from the left in FIG. 1.

The ideal saw feed speed is the speed at which an optimum percent gullet fill is achieved. When the gullet 14' (FIGS. 2, 5 and 6) of a saw blade 14 is overfilled, the chips will be forced out the side of the gullet, causing the saw to start deviating laterally from its path. An ideal gullet fill will change with wood species, dryness, saw shape and saw condition, all of which affect the way the wood chips pack into the gullet. The system of this invention will learn and adapt to these conditions from the saw deviation.

The gullet fill, with a constant saw blade speed, is the depth of cut multiplied by the feed speed. The system speed is calculated from the depth of cut measurement and a gullet fill constant. The gullet fill constant is established first by setting a starting reference speed for a fixed depth of cut. The learning algorithm then adjusts the reference speed by decreasing because of excessive deviation or increasing because of no deviation.

The system speed will learn with each log at an adjustable rate. The learning algorithm uses a number of conditions that must be met for learning to occur. Depth measurements are taken at a defined incremental distance along the log.

The following are conditions for increasing the reference speed.

1. Deviation is less than the deviation limit.
2. The system speed is less than the maximum sawing speed.
3. The operator or master speed is greater than the system speed.
4. The depth of cut is less than the maximum learning depth parameter.
5. All of the above conditions are true for a set number of depth measurements, not including the first predetermined number of entry depth measurements.

The following are conditions for decreasing the reference speed.

1. Deviation is greater than the deviation limit.
2. The depth of cut is less than the maximum learning depth parameter.
3. All of the above conditions are true for a set number of depth measurements, not including the first predetermined number of entry depth measurements.

A number of slider adjustments are provided on the computer display, controlled by a computer mouse, for the parameters than can be adjusted by the operator or the production personnel. These adjustments may be made by clicking on the slider pointer with the mouse and sliding it to the new position. No commands or typing is necessary.

The Approach Maximum Speed slider adjustment will limit the manual speed before reaching the saw. The Saw Speed Maximum slider adjustment limits the saw speed. The system speed will be calculated for a constant gullet fill based on a depth of cut, up to the Sawing Speed Maximum.

The Entry Percent Speed slider adjustment determines the speed at which the log will enter the cut. This percentage is taken of the first cutting depth speed calculated, and provides the softening to prevent excessive deviation due to the shock of the initial loading of the saw as it enters a log.

The Deviation Limit slider adjustment is the amount of deviation at which the system starts immediately decreasing the speed to minimize the deviation. Speed will be decreased proportional to the deviation by the amount set in the Deviation Effect Percent slider adjustment, which limits the decrease to a percentage of the speed being requested by the depth of cut.

The Learn Rate slider adjustment is the amount of decrease to the Speed Reference because of excessive deviation or increase because of no deviation. The Speed Reference is used for calculating the system speed for a constant gullet fill. The Speed Reference slider adjustment is the starting point or the reset value of the Speed Reference, which is the feed rate for a fixed depth of cut. The adapted Speed Reference value is displayed to provide an indication of the condition and assist in determining a starting value for different species. It would normally be reset to the starting value when a saw change is done, since it will normally decrease as the saw gets dull.

It will be apparent to those skilled in the art that various changes may be made in the size, shape, type, number and arrangement of parts described hereinbefore. For example, the system may be utilized for cutting a variety of wood objects other than logs. Thus, it may be utilized in the cutting of cants and dimension lumber. Although the system is described herein associated with a band saw, it also may be used with large circular saws. More than one camera may be required to cover the depth of cut and the saw blade deviation. These and other changes may be made without departing from the spirit of this invention and the scope of the appended claims.

I claim:

1. A wood saw feed speed system for use with transport mechanism for moving wood through a band saw blade by variable speed drive means, the feed system comprising:

a) a first structured light arranged to depict the profile of wood on the transport mechanism for measuring depth of cut in the wood by the saw blade, the first structured light being disposed at an angle of 30°–60° to the axis of wood to be cut, b) a second structured light arranged for display on the saw blade for detecting the lateral deviation of the blade from the intended straight plane of the saw kerf through the wood, c) video camera means arranged to cover depth of cut and saw blade deviation by viewing the projections of the first and second structured lights, the camera having a video output, and d) data processing means having a computer provided with a video frame grabber connected to the video output of the camera for receiving video images from the camera and having an output arranged for connection to the power means of the transport mechanism, the data processing means producing speed control from the video images from the camera for controlling the speed of the power means of the transport mechanism.

2. A wood saw feed speed system for use with transport mechanism for moving wood through a band saw blade by variable speed drive means, the feed system comprising:

a) a first structured light arranged to depict the profile of wood on the transport mechanism for measuring depth of cut in the wood by the saw blade, b) a second structured light arranged for display on the saw blade for detecting the lateral deviation of the blade from the intended straight plane of the saw kerf through the wood, the second structured light being disposed at an angle of 5–25° to the side surface of the saw blade, c) video camera means arranged to cover depth of cut and saw blade deviation by viewing the projections of the first and second structured lights, the camera having a video output, and d) data processing means having a computer provided with a video frame grabber connected to the video output of the camera for receiving video images from the camera and having an output arranged for connection to the power means of the transport mechanism, the data processing means producing speed control from the video images from the camera for controlling the speed of the power means of the transport mechanism.

3. The system of claim 2 wherein the second structured light is disposed at angle of about 10° to the side surface of the saw blade.

4. A wood saw feed speed system for use with transport mechanism for moving wood through a band saw blade by variable speed drive means, the feed system comprising:

a) a first structured light arranged to depict the profile of wood on the transport mechanism for measuring depth of cut in the wood by the saw blade, the first structured light being disposed at angle of about 30° to the axis of wood to be cut, b) a second structured light arranged for display on the saw blade for detecting the lateral deviation of the blade from the intended straight plane of the saw kerf through the wood, the second structured light being disposed at an angle of about 10° to the side surface of the saw blade, c) video camera means arranged to cover depth of cut and saw blade deviation by viewing the projections of the first and second structured lights, the camera having a video output, and d) data processing means having a computer provided with a video frame grabber connected to the video output of the camera for receiving video images from the camera and having an output arranged for connection to the power means of the transport mechanism, the data processing means producing speed control from the video images from the camera for controlling the speed of the power means of the transport mechanism.

\* \* \* \* \*